US007270211B1

(12) United States Patent
Jones (10) Patent No.: US 7,270,211 B1
(45) Date of Patent: Sep. 18, 2007

(54) COMPRESSED AIR MOTORCYCLE LIFT ADAPTED FOR INTERNAL PLACEMENT WITHIN FRONT FORKS OF A MOTORCYCLE

(76) Inventor: C. Ray Jones, 17181 E. Reno, Choctaw, OK (US) 73066

( * ) Notice: Subject to any disclaimer, the term of this patent is extended or adjusted under 35 U.S.C. 154(b) by 387 days.

(21) Appl. No.: 10/874,037

(22) Filed: Jun. 22, 2004

Related U.S. Application Data (60) Provisional application No. 60/484,118, filed on Jul. 1, 2003.

(51) Int. Cl.
*B60G 17/04* (2006.01)

(52) U.S. Cl. .................... 180/219; 280/5.514; 280/276

(58) Field of Classification Search ................ 180/219, 180/227, 5.514; 280/275, 276, 755, 5.514
See application file for complete search history.

(56) References Cited

U.S. PATENT DOCUMENTS

| | | | |
|---|---|---|---|
| 4,015,859 A | | 4/1977 | Hegel |
| 4,422,661 A | * | 12/1983 | Kawamura .................. 200/276 |
| 4,462,610 A | * | 7/1984 | Saito et al. .............. 280/6.159 |
| 4,568,101 A | * | 2/1986 | Bleustein et al. .......... 180/227 |
| 4,815,758 A | | 3/1989 | Yoshida |
| 5,201,384 A | | 4/1993 | Kiyota |
| 5,211,420 A | * | 5/1993 | Iwashita ................... 280/5.503 |
| 5,348,112 A | | 9/1994 | Vaillancourt |
| 5,533,586 A | | 7/1996 | Thompson |
| 5,711,390 A | | 1/1998 | Hikichi |
| 5,860,660 A | * | 1/1999 | Garcia ........................ 280/201 |
| 6,044,940 A | | 4/2000 | Marzocchi |
| 6,182,993 B1 | | 2/2001 | Berkmann |
| 6,520,524 B1 | | 2/2003 | Costa |
| 6,533,305 B1 | | 3/2003 | Falk |
| 7,017,928 B2 | * | 3/2006 | Felsl et al. .................. 280/276 |

FOREIGN PATENT DOCUMENTS

EP          0362912      *   4/1990

* cited by examiner

*Primary Examiner*—Anne Marie Boehler
(74) *Attorney, Agent, or Firm*—Randal D. Homburg (57) ABSTRACT

A motorcycle lift device is adapted to be fitted to any two of three wheeled motorcycle, the motorcycle lift device having an on board air compression generating device providing compressed air to a pair of air driven pistons placed within the existing front forks of the motorcycle requiring no adaptation to the motorcycle other than a replacement cap through which compressed air lines air run, connecting the pistons to the air compression generating device. The pistons are manually activated by a switch mounted in the immediate vicinity of the motorcycle hand grips, the switch activating an air compressor and a solenoid switch directing air to the air lines, extending or retracting the pistons, raising and lowering the height of the motorcycle This manual and controlled height adjustment allows the motorcycle operator to lower the height of the motorcycle at a stop for more secure footing while at rest with the depression of the switch, and raising the motorcycle to a travel height with a depression of the same switch. A computer controlled version of this device is also disclosed which raises and lowers the height of the motorcycle based upon the speed of the motorcycle.

6 Claims, 7 Drawing Sheets

COMPRESSED AIR MOTORCYCLE LIFT ADAPTED FOR INTERNAL PLACEMENT WITHIN FRONT FORKS OF A MOTORCYCLE

CROSS REFERENCE TO RELATED APPLICATIONS

Inventor claims benefit of Provisional Patent Application No. 60/484,118 filed Jul. 1, 2003.

I. BACKGROUND OF INVENTION

1. Field of the Invention

A motorcycle lift device is adapted to be fitted to any two of three wheeled motorcycle, the motorcycle lift device having an on board air compression generating device providing compressed air to a pair of air driven pistons placed within the existing front forks of the motorcycle requiring no adaptation to the motorcycle other than a replacement cap through which compressed air lines air run, connecting the pistons to the air compression generating device. The pistons are manually activated by a switch mounted in the immediate vicinity of the motorcycle hand grips, the switch activating an air compressor and a solenoid switch directing air to the air lines, extending or retracting the pistons, raising and lowering the height of the motorcycle. This manual and controlled height adjustment allows the motorcycle operator to lower the height of the motorcycle at a stop for more secure footing while at rest with the depression of the switch, and raising the motorcycle to a travel height with a depression of the same switch. A computer controlled version of this device is also disclosed which raises and lowers the height of the motorcycle based upon the speed of the motorcycle.

2. Description of Prior Art

The following United States patents are identified and disclosed herein. Several devices are disclosed relating to motorcycle suspensions and height adjustment means. In a first U.S. Patent to Costa, a front fork adjusting means is disclosed as comprising a leg for engaging a front wheel axle, a lower tube from the leg, an upper tube telescopically engaging the lower tube and coupled to a steering tube, an upper endplug on the upper end of the upper tube, a pushrod depending from the endplug, a first main spring between the leg and pushrod, an annular piston having a valve element for regulating fluid flow between an annular space between the upper and lower tubes and a space in the upper tube above the above the lower tube within the lower tube, as second top out spring, ans perhaps several other springs, the height adjusted by either adding fluid by an undisclosed means or by using a wrench to rotate a threaded stud.

U.S. Pat. No. 6,533,305 to Falk uses a rocker arm externally attached to the forks to raise and lower the front of the bike along with pneumatic springs using an attached air pressure source. Hydropenumatic or other type adjustable shocks are disclosed in U.S. Pat. No. 5,533,586 to Thompson, U.S. Pat. No. 6,044,940 to Marzocchi and U.S. Pat. No. 4,015,859 to Hegel, but do not appear to be adapted to be fitted within the front forks of a motorcycle to raise and lower the height of a motorcycle.

U.S. Pat. No. 4,815,758 to Yoshida, U.S. Pat. No. 5,201,384 to Kiyota and U.S. Pat. No. 5,348,112 to Vaillancourt are height adjusting devices located on the middle or rear portion of a motorcycle, but also not adapted to be fitted within the existing front forks of a motorcycle. An automatic height adjustment system for a motorcycle including a method of sensing speed and adjusting the height accordingly is disclosed in U.S. Pat. No. 5,711,390 to Hikichi, including a rear wheel link mechanism for raising and lowering the rear wheel of the motorcycle.

None of the disclosed patents indicate a height adjusting air cylinder adapted to be placed within the existing forks of a motorcycle with a manually or computer automatically adjusting means for delivering air to the air cylinders which raise and lower the front of the motorcycle by adjusting the height of the front forks during road operation of the motorcycle.

II. SUMMARY OF THE INVENTION

Motorcycle operators come in various heights and stature. Those of short stature often have difficulty at slow speeds or a stops having the ability to place both feet securely on the ground to hold the motorcycle in a relatively level position. This is even more difficult when a passenger is on the motorcycle, as is common in touring motorcycles, including the Honda GOLDWING® and other large motorcycles. In wet conditions or on slick pavement, additional difficulty is encountered.

The compressed air motorcycle height adjustment device adapted to the front forks of a motorcycle is provided to allow a motorcycle of less than average height, to lower the monocycle from a riding height to a lower height during a stop, letting the rider place his feet flat on the pavement to gain better control of the motorcycle while at rest. Many motorcycles of a fixed height, or a motorcycle having a set adjustable height, are too tall for a shorter rider to place both feet flat while at a stop to maintain the balanced erect orientation of the very heavy motorcycles, some riders having to place only one foot on the ground at a time. By allowing the rider to control the height of the motorcycle by a simple switch placed near the hand grips of the motorcycle, the rider may lower the motorcycle as it comes to a stop, place both feet comfortably and securely on the ground, and when starting to move forward, activated the switch again, raising the motorcycle as it begins to move.

A primary objective of the motorcycle air lift cylinder device to be installed within the existing front forks of a motorcycle without significant modification to the motorcycle and without permanent modification to any component of the original motorcycle with the exception of a small hole drilled into the fork caps of the front forks, the device being attached to and within existing components of the motorcycle and sliding within the front forks of the motorcycle without impeding the function of the front forks as intended by the manufacturer.

A second objective of the device is thus to allow a user of any stature to raise and lower the height of the motorcycle by the simple activation of a manual switch mounted to a hand grip of the motorcycle, the device adapting to fit within the existing front forks of a motorcycle, with an on board air compressor generating unit mounting remotely on the motorcycle, the device placed on the motorcycle as either an original appliance system or an after-market appliance system.

A third objective is to provide the device in an automatic embodiment, using a computer controller module instead of manual switch, sensing the speed and rotation of the front wheel and sending or releasing air front the air cylinders contained within the front forks to adjust the height according to the speed of the motorcycle, which may be programmed to the desire of the user on a computer module keypad.

III. DESCRIPTION OF THE DRAWINGS

The following drawings are informal drawings submitted with this provisional patent application.

IV. DESCRIPTION OF THE PREFERRED EMBODIMENT

For purposes of this application, the compressed air motorcycle lift cylinder device, which is adapted to be fitted within the front forks of a motorcycle, is an after-market or original design apparatus to create a compressed air device to allows a motorcycle rider to adjust the height of the motorcycle by installation of the motorcycle lift within the front forks, raising the height of the motorcycle for travel, while lowering the motorcycle height during a stop. While most front forks for motorcycles are manufactured by Showa Corporation or Kayaba, the motorcycle lift cylinder device is adapted to any front fork 300 which includes an inner fork tube, 310, an outer fork tube 320, a damper rod 330 having a damper rod head 340, a fork spring 350, and a fork cap 360, the fork spring 350 compressed between the damper rod head 340 and the fork cap 360. The motorcycle lift cylinder device comprises essentially an air compressor 100 powered by a 12 volt DC battery 10 of the motorcycle providing air through air lines 150 to a pair of air cylinders 200*a*, 200*b* located within the front forks 300 of the motorcycle, the only adaptation to the motorcycle being a small bore in the fork caps 360 of each front fork 300 forming an air inlet connector 362 allowing for passage of air from the air lines 150 between the compressed air generating unit and the air cylinders 200*a*, 200*b* within the front forks 300 of the motorcycle.

Figure 1:
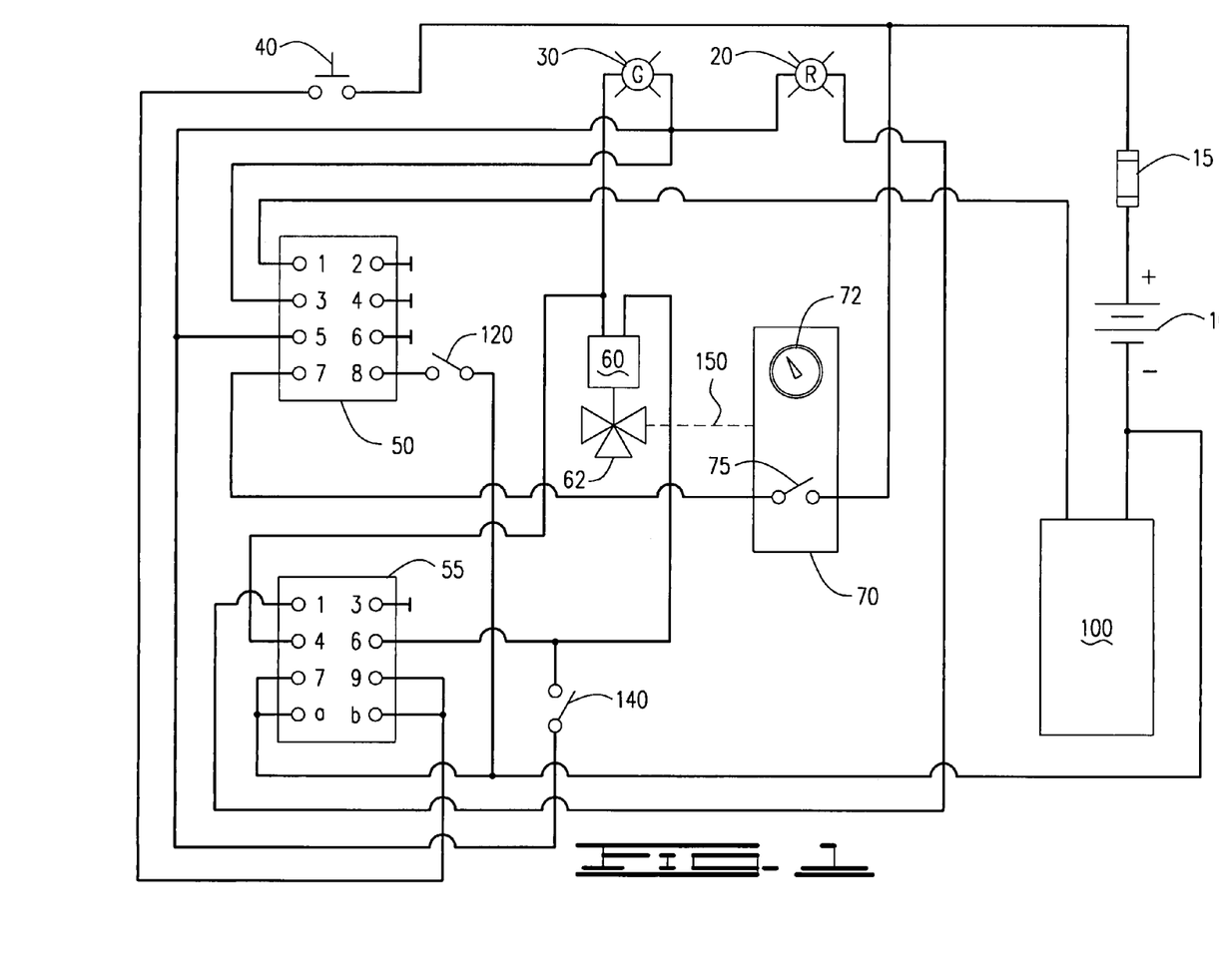
FIG. 1 is a drawing of the electrical schematics of the motorcycle lift cylinder device.

More specifically, the manual version of the motorcycle lift cylinder device is shown in FIGS. 1-4 of the drawings, the basic electrical system requirements including the 12 volt DC battery 10 of the motorcycle, a fuse 15, a red light 20 to indicate the lowered position of the motorcycle, a green light 30 to indicate the raised position of the motorcycle, a control button 40, a first control switch 120 to release stored generated air from the air storage tank 110 to a check valve 130 and second control switch 140 to release the air flow between the check valve 130 and the pair of air cylinders 200*a*, 200*b*, a first relay 50, a second relay 55, a solenoid air valve 60 including an exhaust 62, and a manifold 70 containing an air gauge 72 and an air pressure switch 75, as defined in the electrical schematics of FIG. 1. The air generating unit is more specifically shown in FIG. 2 of the drawings, comprising an air compressor 100, an air tank 110, the gauge 72, the air pressure switch 75, the check valve 130, the first control switch 120, the second control switch 140, the solenoid air valve 60 with the exhaust 62 and the pair of air cylinders 200*a*, 200*b*. A desiccant unit or dryer may also be located in the air lines to abate condensation in the air flowing through the air lines.

Figure 3:
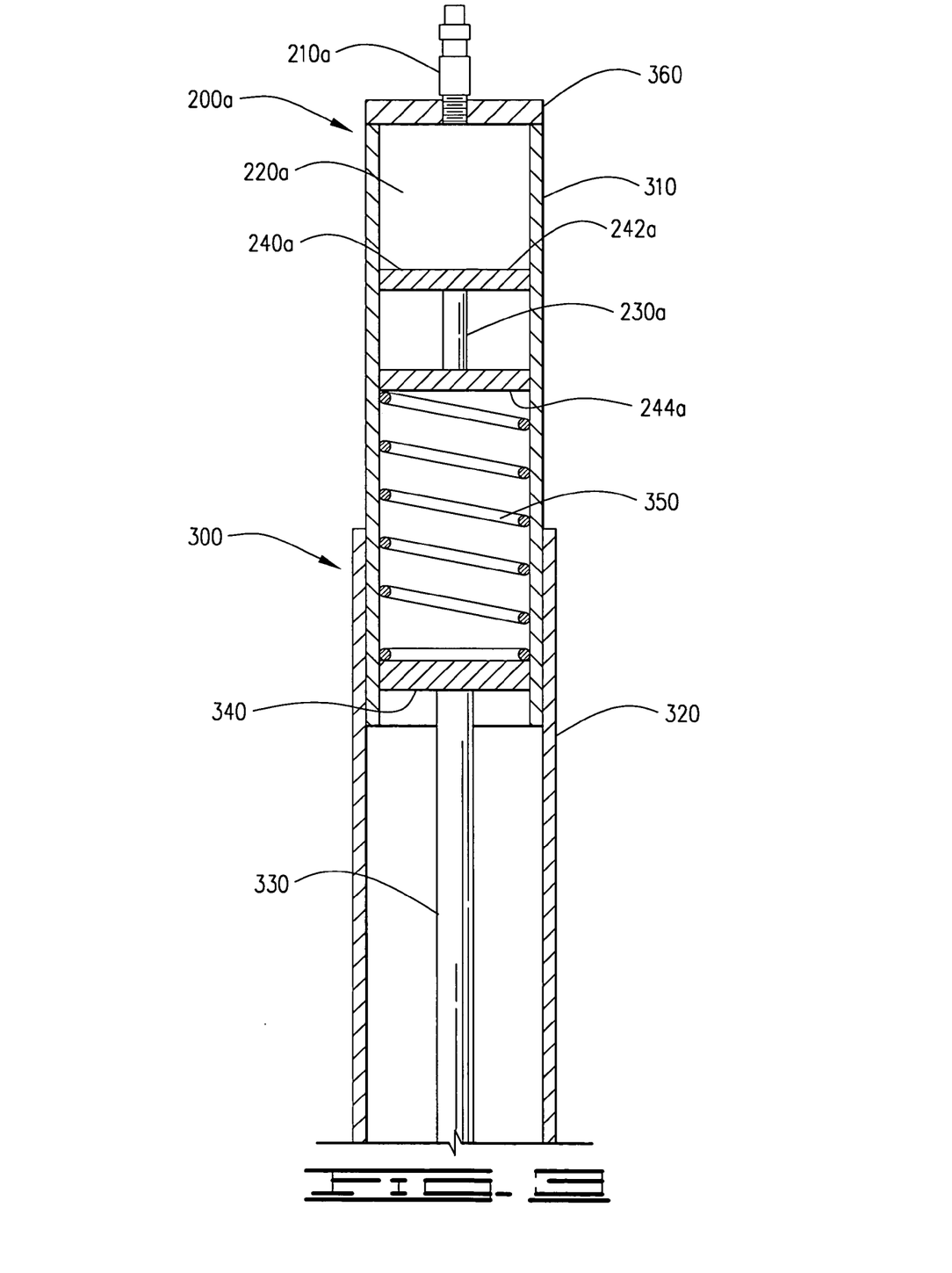
FIG. 3 is a drawing of a first embodiment of the air cylinder adapted to be fitted within the front forks of a motorcycle.
Figure 4:
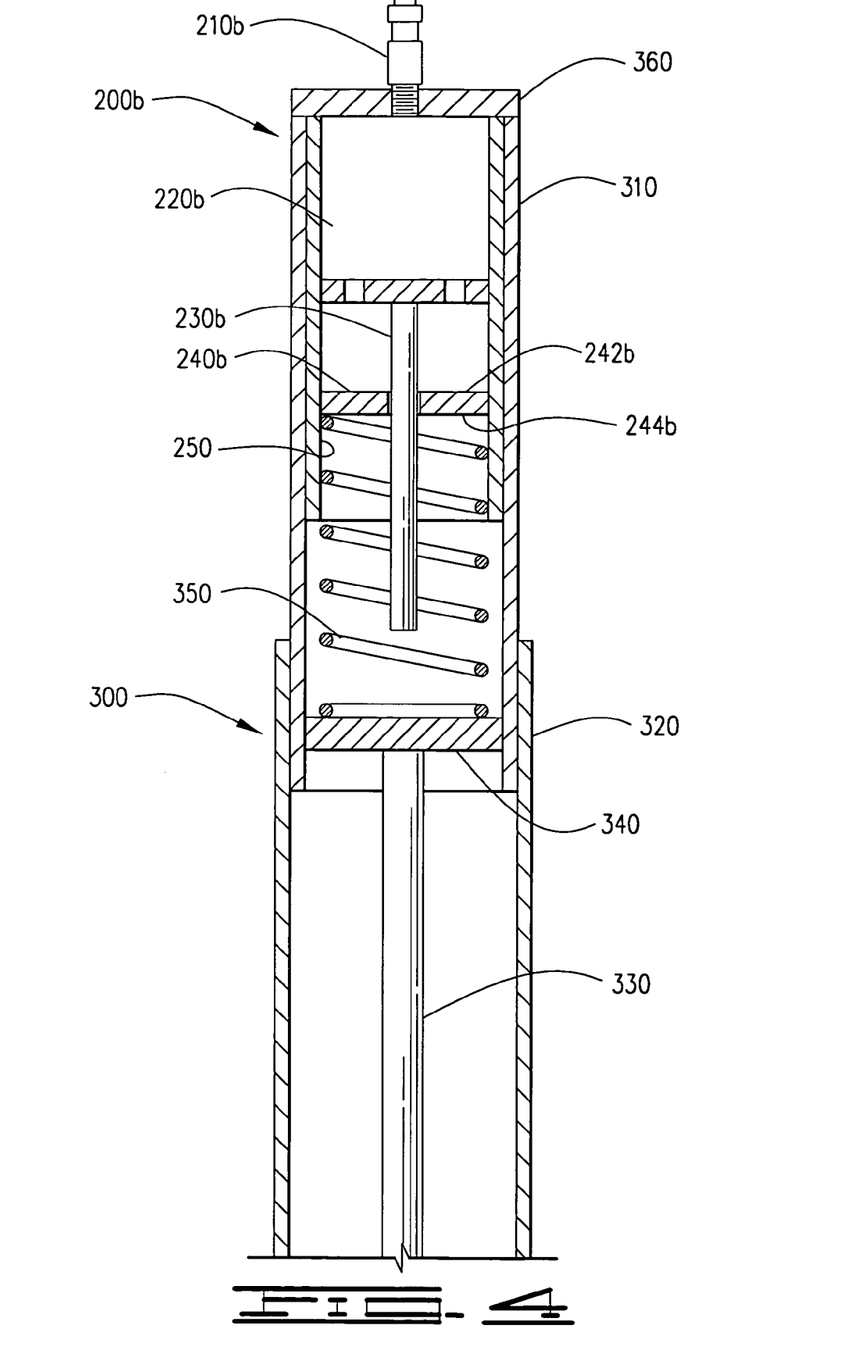
FIG. 4 is a drawing of a second embodiment of the air cylinder adapted to be fitted within the front forks of a motorcycle.

The air cylinders 200*a*, 200*b* are installed by removal of the fork cap 360, boring a hole in the fork cap to create an air inlet 210*a*, 210*b* for the air lines 150, placing the air cylinders within the inner fork tube 310 above the fork spring 350, and replacing the fork cap 360 within the each front fork 300 retaining the air cylinder 200*a*, 200*b* within each front fork 300, and attaching air lines 150 to each air cylinder through the air inlet 210*a*, 210*b* in the fork cap 360. It may be preferred that the fork spring 350 accompanying the motorcycle be replaced by a shorter spring if the tension of the front forks 300 is too tight for the comfort of the user.

The air cylinders are provided in at least two embodiments, with a first embodiment 200*a* shown in FIG. 3 of the drawings and a second embodiment 200*b* shown in FIG. 4 of the drawings. In the first embodiment, the air cylinder 200*a* includes the air inlet 210*a*, an air piston cylinder 220*a*, a piston rod 230*a*, and a piston head 240*a* having an upper surface 242*a* and a lower surface 244*a*, with said lower surface 244*a* mounted above the fork spring 350 within the inner fork tube 310, the inner fork tube 310 slidingly engaging the outer fork tube 320 with the damper rod 330 and damper rod head 340 providing a base for the fork spring 350, the fork spring 350 compressed between the lower surface 244*a* of the piston head 240*a* and the damper rod head 340. When air is forced into the air piston cylinder 220*a* against the upper surface 242*a* of the piston head 240*a*, the piston rod 230*a* attached to the piston head 240*a* is forced outward from the air piston cylinder 220*a*, forcing the piston head 240*a* against the fork spring 350, extending the outer fork tube 320 from the inner fork tube 310, raising the height of the front of the motorcycle. A secondary spring may be situated above the piston head to urge the piston head towards the fork spring when the air pressure is low.

The second embodiment of the air cylinder 200*b*, works in the same manner, and also contains an air inlet 210*b*, an air piston cylinder 220*b*, a piston rod 230*b*, a piston head 240*b* having an upper surface 242*b* and a lower surface 244*b*, but also contains a piston sleeve 250, extending past the lower surface 244*b* of the piston head 240*b*, attached to the air piston cylinder 210*b*, the piston sleeve 250 containing a portion of the fork spring 350. When air is forced into the air piston cylinder 220*b* against the upper surface 242*b* of the piston head 240*b*, the piston rod 230*b*, which slides along the piston rod 240*b*, is forced outward from the air piston cylinder 220*b*, forcing the piston head 240*b* against the fork spring 350, extending the outer fork tube 320 from the inner fork tube 310, raising the height of the front of the motorcycle. In this embodiment, the fork spring 350 may require replacement, substituting a spring having a smaller outer diameter than the fork spring 350 which is provided with the motorcycle or the fork spring would need to be modified to this air cylinder 200*b*.

Figure 2:
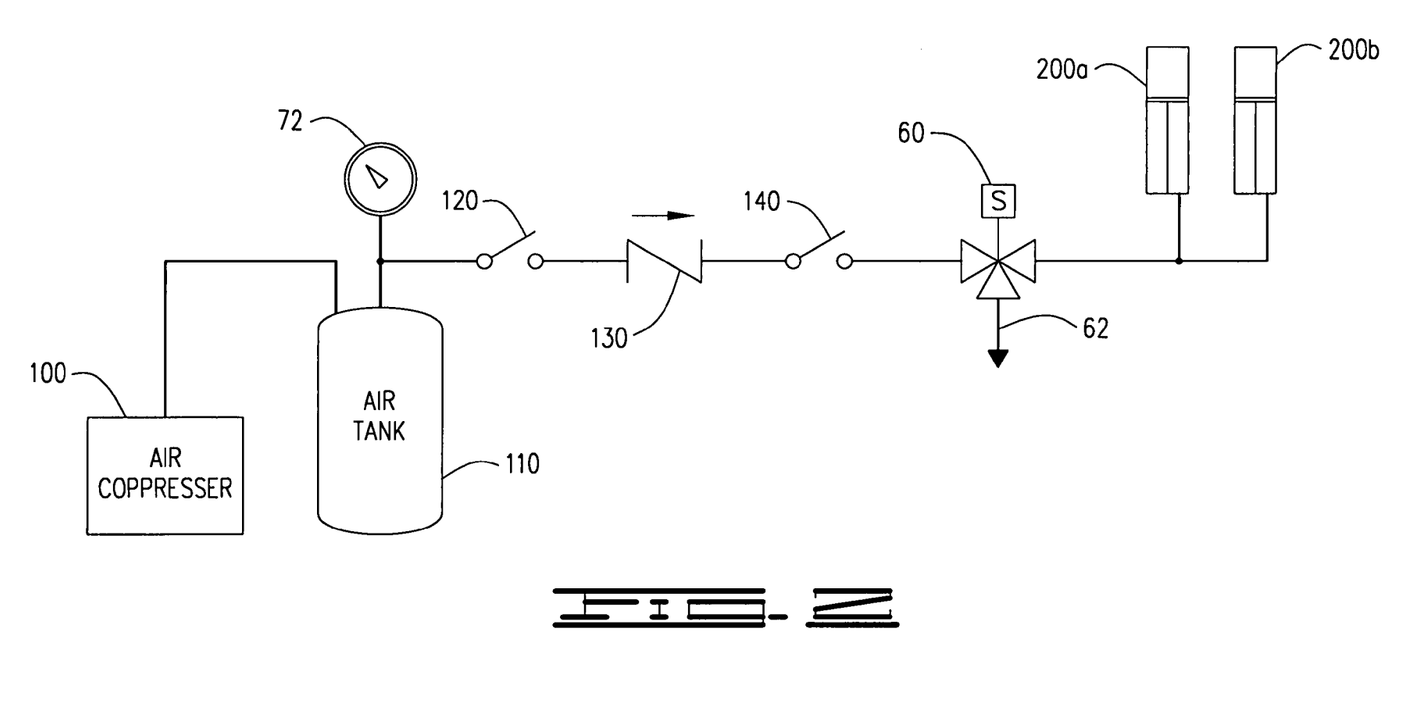
FIG. 2 is a drawing of the air components of the motorcycle lift cylinder device.

The manual version includes a control button 40 activating a first control switch 120 and a second control switch 140, with the control button 40 preferably mounted near the grip portion of the handlebars of the motorcycle, providing convenient access to the rider, making movement of the hand to locate the control button 40 unnecessary. The control button 40, is most preferably a double pole/double throw switch which allows an on and off button on the same switch. When the control button 40 is depressed, a signal is sent through the first relay 50 to the air compressor 100 to generate compressed air to the air tank 110, which is released by the first control switch 120 through the check valve 130 to the second control switch 140, which then directs the compressed air to the solenoid valve 60, which sends the compressed air through the air lines 150 to the air cylinders 200a, 200b, forcing the piston rods 230a, 230b outward, raising the height of the motorcycle. The green light 30 is illuminated.

When the control button 40 is again depressed, air is released from the air cylinders 200a, 200b, to the solenoid valve 60, wherein the second control switch 140 directs the released air to the exhaust 62 allowing the weight of the motorcycle to retract the piston heads 240a, 240b within the air piston cylinders 220a, 220b, releasing pressure on the fork spring 350, lowering the height of the motorcycle. The red light 20 is illuminated to indicate the lowered state of the motorcycle.

Figure 5A:
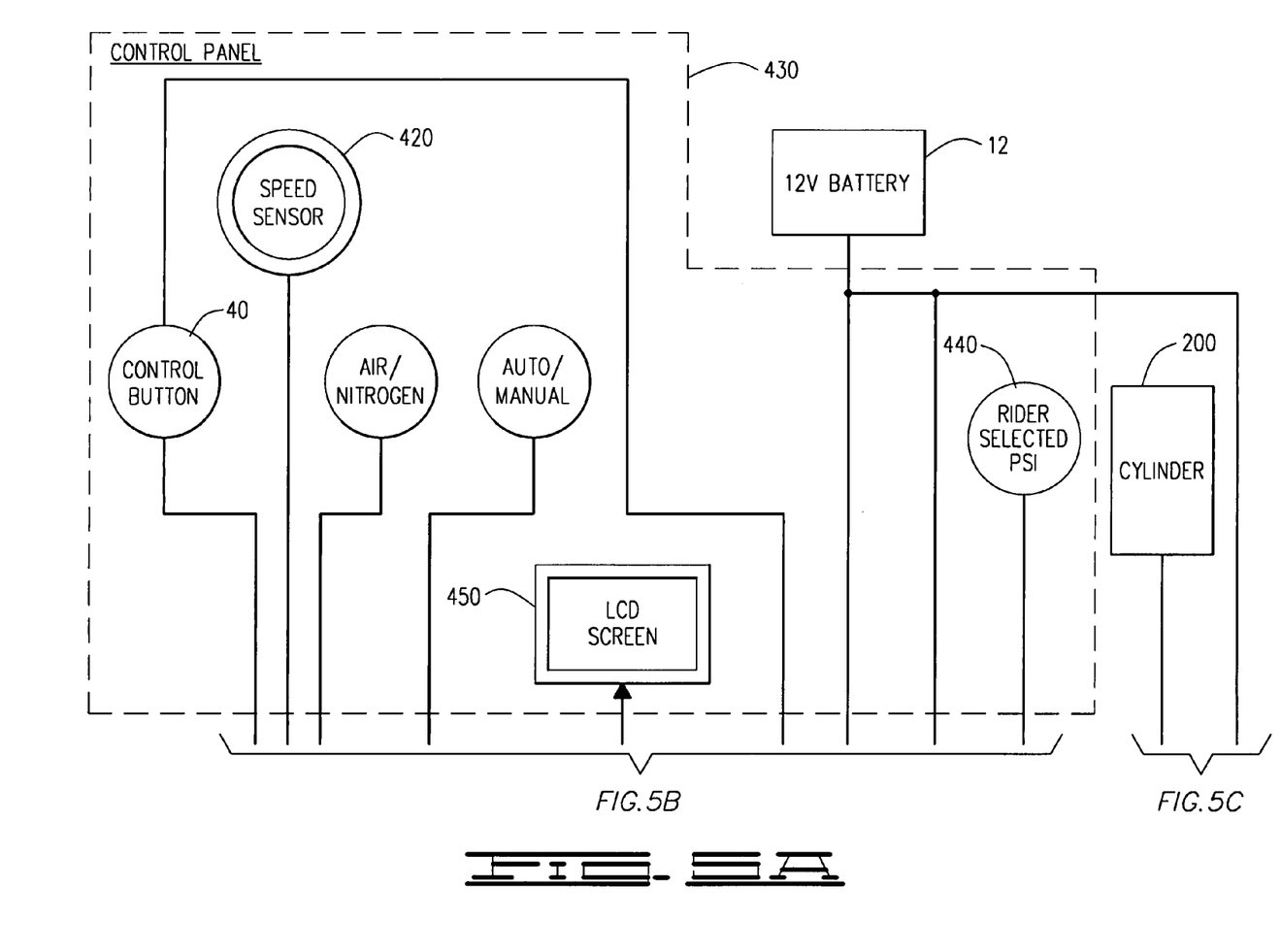
FIGS. 5*a*-5*c* are an electrical diagram of the basic computer controller module for the motorcycle lift device.
Figure 5B:
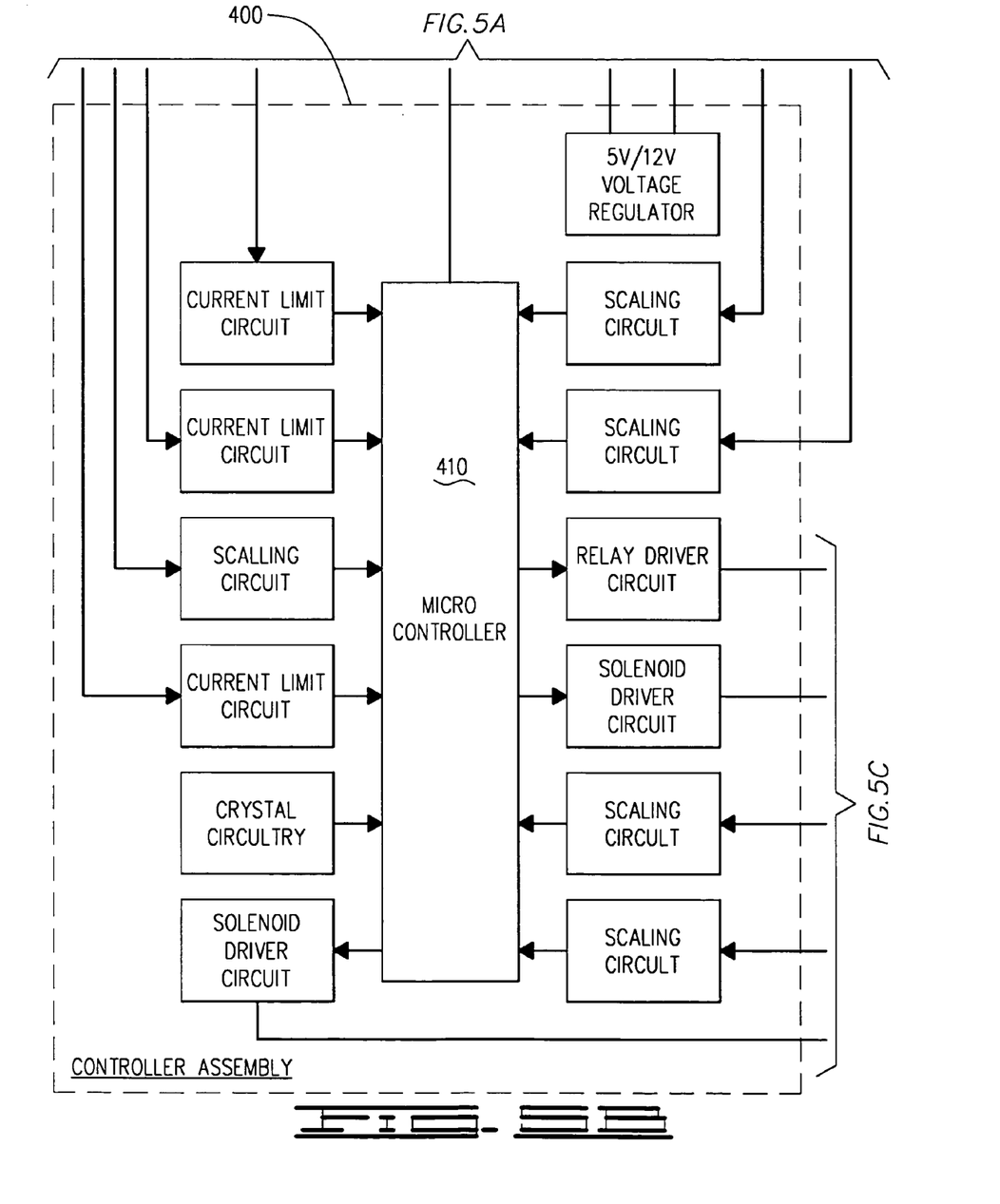
Figure 5C:
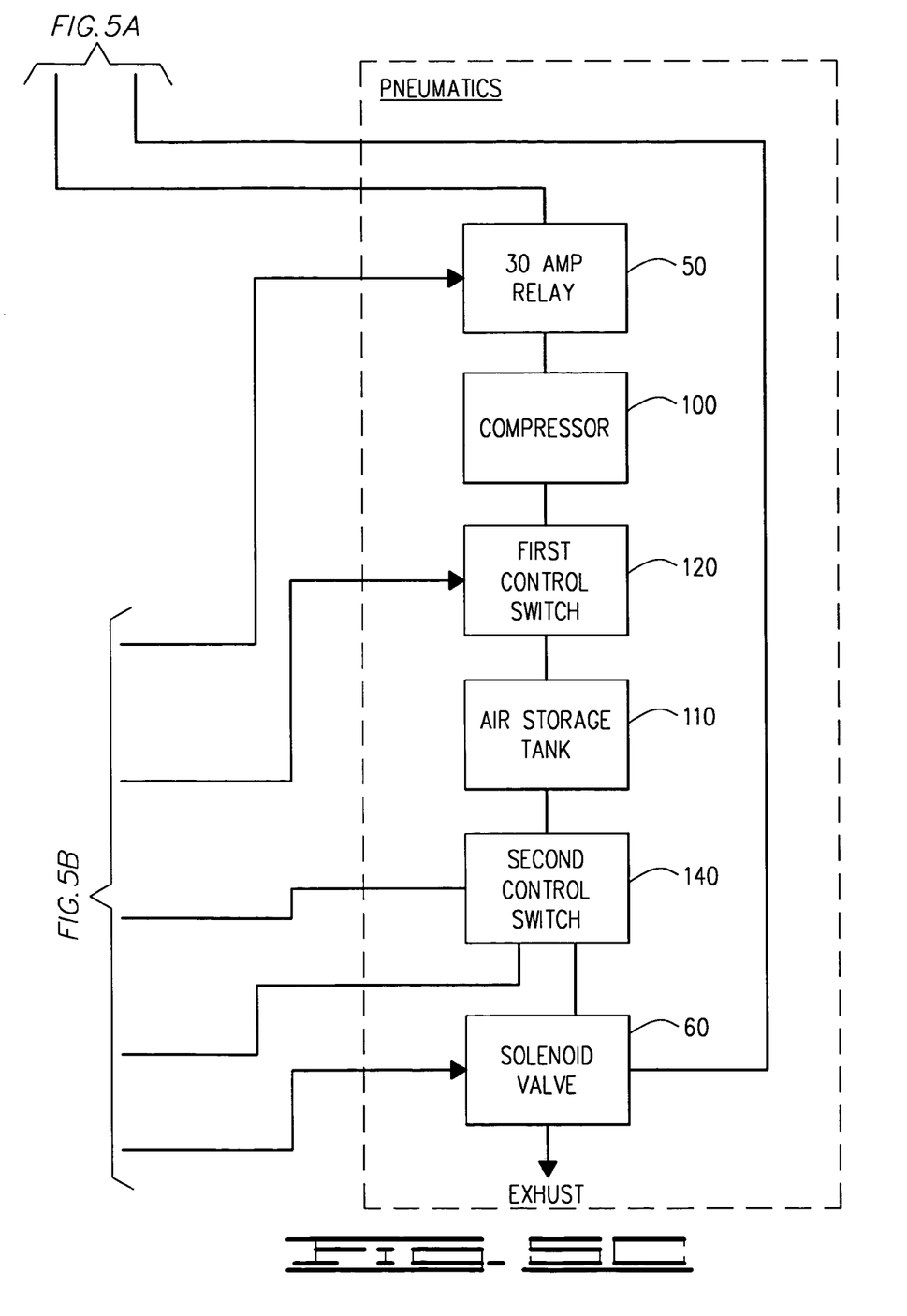

There is also provided an automatic embodiment, FIGS. 5a-5c, which is now merely activated by the control button 40, the manual control button with a computer controlled mechanism which controls air flow to the air cylinders 200a, 200b automatically. In a basic embodiment, the automatic embodiment includes a computer controller assembly 400 having a programmed microcontroller 410, a speed sensor means 420 which sends signal to the microcontroller based upon the speed of the motorcycle, preferably the rpm of the front wheel, and a control panel 430 including a rider selected PSI control 440 and an LCD readout screen 450, to supply the rider with information regarding the system. As shown in FIGS. 5a-5c, the computer controller assembly 400, connected to the 12 V DC battery 10, controls the operation of the air cylinders 200a, 200b, by sensing the speed of the motorcycle through the speed sensor means 420, which extends the air cylinders 200a, 200b with compressed air at a set minimum acceleration speed, and lowers the air cylinders 200a, 200b by the release of the compressed air from the air cylinders as a set minimum deceleration speed or at a stop. The microcontroller 410 connects to the air compressor, to the first control switch 120 and the second control switch 140 and also to the solenoid 60 to control the function of these connected components, as indicated in the referenced FIGS. 5a-5c.

Though the embodiments of the have been described and shown above, it will be appreciated by those skilled in the art that numerous modifications may be made therein without departing from the scope of the invention as herein described. these modification may include different wiring schemes or air line components, but the general spirit of the invention, to raise and lower the height of the motorcycle by components installed in the front forks of a motorcycle without substantial alteration of the motorcycle is preserved.

What is claimed is:

1. A motorcycle lift cylinder device adapted to a pair of front forks of a motorcycle having an inner fork tube, an outer fork tube, a damper rod with a damper rod head, a fork spring, and a fork cap, with said fork spring compressed between said damper rod head and said fork cap, said motorcycle lift cylinder device comprising:

a control button connected from a 12 volt DC battery on said motorcycle, said control button connecting to a first relay and a second relay;

an air compressor activated by said first relay providing compressed air to an air tank;

an air gauge with an air pressure switch monitoring said air pressure within said air tank;

a first control switch operated by said first relay controlling air flow from said air tank through a check valve to a second control switch operated by said second relay, further directing air flow to a solenoid valve, controlled by said second relay, said solenoid valve releasing said compressed air through air lines to a pair of air cylinders located within said front forks of said motorcycle, said fork caps of each front fork modified to include an air inlet connector allowing for passage of air from said air lines between said solenoid valve and said air cylinders within said front forks of said motorcycle, wherein compressed air is delivered to said air cylinders as said control button is first depressed, extending said air cylinders causing said front forks to be extended raising the height of said motorcycle after which said compressed air is released from said air cylinders by depressing said control button, allowing said air cylinders to be compressed by the weight of said motorcycle, lowering the height of said motorcycle, wherein said control button is a double pole, double throw switch which, when once depressed, sends a signal through said first relay to said air compressor to generate compressed air to said air tank, said compressed air released from said air tank by said first control switch through said check valve to said second control switch, which then directs said compressed air to said solenoid valve, further directing said compressed air through said air lines to said air cylinders, forcing piston heads within said air cylinders against said fork springs, raising the height of said motorcycle, causing a green light to be illuminated near said control button, after which depressing said control button again causes air to be released from said air cylinders to said solenoid valve, as said second control switch directs the released air to an exhaust in said solenoid valve, allowing the weight of said motorcycle to retract said piston heads in said air cylinders, releasing pressure on said fork springs lowering the height of said motorcycle, causing a red light to be illuminated near said control button.

2. The device, as disclosed in claim 1, wherein said air cylinder further comprises:

an air piston cylinder;

a piston rod; and a piston head having an upper surface and a lower surface, with said lower surface mounted above said fork spring within said inner fork tube, said inner fork tube slidingly engaging said outer fork tube with said damper rod and damper rod head providing a base for said fork spring, said fork spring compressed between said lower surface of said piston head and said damper rod head, wherein said compressed air is forced into said air piston cylinder, said piston rod attached to said piston head is forced outward from said air piston cylinder, forcing said piston head against said fork spring, extending said outer fork tube from said inner fork tube, raising the height of said motorcycle.

3. The device, as disclosed in claim 1, wherein said air cylinder further comprises:

an air piston cylinder;

a piston rod;

a piston head having an upper surface and a lower surface; and a piston sleeve, extending past said lower surface of said piston head, attached to said air piston cylinder, said piston sleeve containing a portion of said fork spring, wherein compressed air is forced into said air piston cylinder against said upper surface of said piston head, said piston rod, which slides along said piston rod, is forced outward from said air piston cylinder, urging said piston head against said fork spring, extending said outer fork tube from said inner fork tube, raising the height of said motorcycle.

4. A motorcycle lift cylinder device adapted to a pair of front forks of a motorcycle having an inner fork tube, an outer fork tube, a damper rod with a damper rod head, a fork spring, and a fork cap, with said fork spring compressed between said damper rod head and said fork cap, said motorcycle lift cylinder device comprising:

- a control button connecting to a 12 volt DC battery on said motorcycle;
- a computer controller assembly having a programmed microcontroller;
- a speed sensor means which sends signal to the microcontroller based upon the speed of the motorcycle;
- a control panel including a rider selected PSI control and an LCD readout screen supplying the rider with information regarding the operation of the device;
- an air compressor activated by said a first relay providing compressed air to an air tank;
- said computer controller assembly controlling the operation of a first control switch operated by a first relay controlling air flow from said air tank through a check valve to a second control switch operated by a second relay, further directing air flow to a solenoid valve, controlled by said second relay, said solenoid valve releasing said compressed air through air lines to a pair of air cylinders located within said front forks of said motorcycle, said fork caps of each front fork modified to include an air inlet connector allowing for passage of compressed air to said air cylinders within said front forks of said motorcycle, said microcontroller sensing the speed of the motorcycle through the speed sensor means, extending said air cylinders with compressed air at a set speed, and lowering said air cylinders by the release of the compressed air through an exhaust in said solenoid valve from the air cylinders as a set speed or at a stop, said microcontroller being electronically integrated with said air compressor, to said first control switch, to said second control switch and to said solenoid.

5. The device, as disclosed in claim 4, wherein said air cylinder further comprises:

- an air piston cylinder;
- a piston rod; and
- a piston head having an upper surface and a lower surface, with said lower surface mounted above said fork spring within said inner fork tube, said inner fork tube slidingly engaging said outer fork tube with said damper rod and damper rod head providing a base for said fork spring, said fork spring compressed between said lower surface of said piston head and said damper rod head, wherein said compressed air is forced into said air piston cylinder, said piston rod attached to said piston head is forced outward from said air piston cylinder, forcing said piston head against said fork spring, extending said outer fork tube from said inner fork tube, raising the height of said motorcycle.

6. The device, as disclosed in claim 4, wherein said air cylinder further comprises:

- an air piston cylinder;
- a piston rod;
- a piston head having an upper surface and a lower surface; and
- a piston sleeve, extending past said lower surface of said piston head, attached to said air piston cylinder, said piston sleeve containing a portion of said fork spring, wherein compressed air is forced into said air piston cylinder against said upper surface of said piston head, said piston rod, which slides along said piston rod, is forced outward from said air piston cylinder, urging said piston head against said fork spring, extending said outer fork tube from said inner fork tube, raising the height of said motorcycle.

* * * * *